3,524,830
ACRYLIC POLYMER COMPOSITION CONTAINING THIOCYANATE SALTS OR THIOUREA

Takashi Minato, Yasuo Matsumura, and Kunio Maruyama, Saidaiji, Japan, assignors to Japan Exlan Company, Ltd., Osaka, Japan
No Drawing. Continuation-in-part of application Ser. No. 527,068, Feb. 14, 1966. This application May 13, 1968, Ser. No. 728,834
Int. Cl. C08c 11/48
U.S. Cl. 260—30.8                                      3 Claims

ABSTRACT OF THE DISCLOSURE

The present disclosure provides for an acrylic polymer composition consisting essentially of (1) an acrylonitrile polymer and (2) a mixed substantially anhydrous molten mixture of at least two compounds selected from a group consisting of sodium thiocyanate, potassium thiocyanate, ammonium thiocyanate and thiourea, said mixture having a melting point below 150° C.

---

This application is a continuation-in-part of my application Ser. No. 527,068, filed Feb. 14, 1966, now abandoned.

This invention relates to polymer compositions useful for the production of moldings, fibers and like materials prepared from acrylonitrile polymers and polymers containing acrylonitrile, which are hereinafter referred to as acrylic polymers. The acrylic polymer includes acrylonitrile homopolymers and copolymers of a major proportion of acrylonitrile and a minor proportion of one or more other ethylenically unsaturated monomers copolymerizable with acrylonitrile.

More particularly, the composition of the present invention comprises novel compositions of acrylonitrile polymers prepared by dissolving the polymer in an anhydrous melt of a mixture of two or more compounds selected from the group of sodium thiocyanate, potassium thiocyanate, ammonium thiocyanate, and thiourea. Preferably, eutectic mixtures are used.

It is known from U.S. Pat. No. 2,140,921 that a concentrated aqueous solution of a thiocyanate salt may be employed as a solvent for acrylic polymers whereby said acrylic polymers are dissolved in a concentrated aqueous solution of a thiocyanate salt at 100° to 110° C., and thereafter made into fibers or the like. Such solutions generally contain about 10–12% polymer solids, and the remainder about equal proportions thiocyanate salt and water.

It is a method wherein the polymer is dissolved in an aqueous solution or hydrate of a thiocyanate and is based on a viewpoint that the presence of water is necessary in order to dissolve an acrylic polymer in a thiocyanate.

From the fact that 1 mol of sodium thiocyanate will make a hydrated state with 10 mols of water but that an acrylic polymer will be dissolved even in an aqueous solution of a thiocyanate of a high concentration by which its stable structure will be destroyed, the present inventors have discovered that a thiocyanate containing less water than in a stable hydrated state, that is, a thiocyanate in an anhydrous state not partially hydrated or, in other words, a thiocyanate itself will contribute to the dissolution of an acrylic polymer and have reached the present invention.

The solvent to be used in the present invention is based on an idea quite different from that of the above-mentioned conventional solvent in the points that it contains no water at all and that a mixed melt showing a low melting point is used. The present invention therefore uses a normally solid substance as a solvent.

However, in order to use a solid substance as a solvent, the substance must be heated to a temperature above its melting point. Thus, for example, sodium thiocyanate has a melting point of about 300° C., so that an acrylic polymer dissolved in this salt in its molten state would actually become degraded and therefore unusable. Further, potassium thiocyanate has a melting temperature of about 180° C. so that even at this temperature, the acrylic polymer could not help being denatured. Finally, the melting point of ammonium thiocyanate is shown to be about 150° C. Above this temperature, ammonium thiocyanate will cause transition and decomposition. Therefore, it could not be used as a solvent either.

According to the present invention, however, it has now been discovered that by using an anhydrous mixed salt melt, the melting point of which is low enough (as shown in Table I) there is obtained a stable acrylic polymer solution in which the acrylic polymer will not become degraded, i.e., decomposed or discolored.

Thus, the solvent to be used in the present invention is quite different from that of the above-mentioned prior art solvents in that (1) it contains no water at all and (2) it employs a mixed melt of at least two salts having a low melting point.

TABLE I

| Mixing system | Eutectic composition in mol ratio | Eutectic temp. in ° C. | Upper limit temp. for heating the solvent in ° C. |
|---|---|---|---|
| NaCNS/KCNS | 23.7/76.3 | 129.5 | 250 and more. |
| NH₄CNS/(NH₂)₂CS | 70/30 | 104 | 130. |
| NaCNS/NH₄CNS | 22/78 | 97 | 130. |
| KCNS/(NH₂)₂CS | 10/90 | 110 | 130. |

In order to obtain a stable polymer solution, a combination of salts in which the eutectic temperature is below 150° C. is desirable. For example, combinations of sodium thiocyanate with potassium thiocyanate, of ammonium thiocyanate with thiourea; of ammonium thiocyanate with sodium thiocyanate; and of potassium thiocyanate with thiourea are suitable. Needless to say, as required, any combination of three or more of these salts can be used.

Advantageously, in preparing the composition of this invention, the two or more anhydrous materials to be used as the solvent mixture are first powdered, and mixed together in ratios which will provide a mixture whose melting point is below that of the degradation temperature of the polymer, and preferably a eutectic mixture whose temperature is below 150° C. These ratios can readily be determined from already known literature data describing the properties of the constituents, or else determined routinely from observation of the melting points of varying proportions of the selected constituents, preferably the lowest melting point of the mixture. The only criterion, as observed above, is that the temperature be below that of the degradation temperature of the polymer itself.

The resulting mixture may then be melted to provide a uniform melt which is crushed and dried. To this uniform mixture is then added up to about 50%, and preferably from 20–40%, based on the weight of the total mixture, of the acrylic polymer, which when heated provides a viscous solution that can be molded, extruded or the like as desired. Alternatively, the polymer may be added to the dried constituents of the mixture and intimately admixed therewith while being heated without said solvent mixture first having been melted and dried beforehand.

The preparation of an acrylic polymer solution of composition by using the above-mentioned mixed melt as a solvent according to the present invention is possible without the need to apply pressure to mold or extruded even in the case where the concentration of the acrylic polymer is very high. Furthermore, as the acrylic polymer solution can be prepared at a comparatively low temperature, the resulting product, when initially formed, is substantially free of bubbles and voids in the polymer.

Finally, when the solvent system according to the present invention is used, a stable polymer solution high in the concentration of the acrylic polymer is obtained. It is therefore evident that, particularly in case molding is carried out by using such polymer solution, industrial productivity will be increased by virtue of starting with high concentrations of polymer.

The acrylic polymer composition according to the present invention can be used for the production of such moldings as fibers and films not only by semi-melt spinning methods but also by known wet spinning processes as well. In the case of semi-melt spinning by using a concentrated aqueous solution of a thiocyanate, bubbles have been produced due to a water vapor and troubles have been caused. However, according to the present invention, as an inorganic salt solvent containing no water at all is used, such troubles have been completely solved.

The ethylenically unsaturated monomers copolymerizable with acrylonitrile that may be employed in the method of this invention include, for example, acrylic acid, methacrylic acid, esters of acrylic acid such as ethyl acrylate, methyl acrylate, butyl acrylate, octyl acrylate, methoxyethl acrylate, phenyl acrylate, cyclohexyl acrylate, dimethylaminoethyl acrylate, etc., esters of methacrylic acid such as methyl methacrylate, ethyl methacrylate, phenyl methacrylate, cyclohexyl methacrylate, dimethylaminoethyl methacrylate, etc., acrylamides and methacrylamides as well as the alkylation products thereof, various unsaturated ketones such as methylvinyl ketone, phenylvinyl ketone, methylisopropyl ketone, etc., esters of alpha-beta-carboxylic acids such as vinyl formate, vinyl acetate, vinyl propionate, vinyl butyrate, vinyl thiolacetate, vinyl benzoate, etc., N-alkylmaleinimide, N-vinylcarbazole, N-vinylsuccinimide, N-vinylphthalimide, vinyl ether, vinyl pyridines such as 2-vinyl pyridine, 4-vinyl pyridine, 2-methyl-5-vinyl pyridine, etc., styrene and its alkylation products, allyl alcohol, vinyl chloride, vinylidene cyanide, methacrylonitrile, α-methylene glutaronitrile, unsaturated sulfonic acids such as allylsulfonic acid, methallyl sulfonic acid, allyloxyethyl sulfonic acid, methallyloxy sulfonic acid, alloxypropanol sulfonic acid, allylthioethyl sulfonic acid and allylthiopropanol sulfonic acid styrenesulfonic acid, etc., as well as various salts thereof, and certain cyclic compounds such as beta-propiolactone.

The following examples are given to further illustrate the invention. It should be understood, however, that the invention is by no means limited thereto. In the example, all percents and parts are by weight unless otherwise specified.

EXAMPLE 1

Dried powdery ammonium thiocyanate and thiourea were mixed together in a mol ratio of 70:30. The mixture was heated and melted at 110° C. so as to be a uniform melt. This melt was quenched, solidified, then crushed and dried. To 70% of this mixture was added 30% of a copolymer consisting of 90 parts of acrylonitrile and 10 parts of methyl acrylate. When the mixture was mixed and was kept at 120° C., in about 30 minutes, a transparent thread-drawable acrylic polymer composition was obtained. Its viscosity showed 4300 poises. Then, when the acrylic composition was cast on a glass plate, cooled, solidified, and was then cleaned in water, a transparent elongatable film was obtained.

EXAMPLE 2

Dried powdery sodium thiocyanate and potassium thiocyanate were mixed together in a mol ratio of 25:75. The mixture was heated and melted at 135° C. so as to be a uniform melt. This melt was quenched, solidified, then crushed and dried. Into 80 parts of this mixture were mixed 20 parts of an acrylonitrile polymer. When the mixture was left in an air bath at 140° C. for about 1 hour, a transparent thread-drawable polymer composition was obtained.

EXAMPLE 3

20% of an acrylic copolymer consisting of 69 parts of acrylonitrile and 31 parts of styrene was added to 80% of the mixture of sodium thiocyanate and potassium thiocyanate used in Example 2. When the mixture was mixed and was kept at 145° C., in about 30 minutes, a transparent thread-drawable acrylic polymer composition was obtained.

EXAMPLE 4

30% of an acrylic polymer consisting of 90 parts of acrylonitrile and 10 parts of methyl acrylate was added to 70% of the mixture of sodium thiocyanate and potassium thiocyanate used in Example 2. When the mixture was mixed and was kept at 150° C., in about 20 minutes, a transparent thread-drawable acrylic polymer composition was obtained. Its viscosity showed 1400 poises.

EXAMPLE 5

Dried powdered sodium thiocyanate and ammonium thiocyanate were mixed together at a mol ratio of 22:78. The mixture was heated and melted at 110° C. so as to be a uniform melt. This melt was quenched, solidified, then crushed and dried. To 80% of this mixture was added 20% of an acrylic polymer consisting of 64 parts of acrylonitrile and 36 parts of methyl acrylate. When the mixture was kept at 130° C., in about 30 minutes, a transparent thread-drawable polymer composition was obtained.

EXAMPLE 6

40% of an acrylic polymer consisting of 90 parts of acrylonitrile and 10 parts of methyl acrylate was added to 60% of the mixture of sodium thiocyanate and ammonium thiocyanate used in Example 5. When the mixture was kept at 130° C., a transparent thread-drawable polymer composition was obtained. Its viscosity showed 3300 poises. When this polymer composition was extruded into air through fine orifices and was washed with water, elongatable fibers were obtained.

EXAMPLE 7

Dried powdery sodium thiocyanate and potassium thiocyanate were mixed together in a mol ratio of 20:80. The mixture was heated and melted at 135° C. so as to be a uniform melt. This melt was quenched, solidified, then crushed and dried. Into 80 parts of this mixture were mixed 20 parts of a copolymer consisting of 80 parts of acrylonitrile and 20 parts of vinyl acetate. When the mixture was left in an air bath at 140° C. for about 1 hour, a transparent thread-drawable polymer composition was obtained.

EXAMPLE 8

20% of an acrylic copolymer consisting of 90 parts of acrylonitrile, 9 parts of methyl acrylate and 1 part of sodium methallyl sulfonate was added to 80% of the mixture of sodium thiocyanate and potassium thiocyanate used in Example 7. When the mixture was mixed and was kept at 140° C. for about 1 hour, a transparent thread-drawable polymer composition was obtained.

EXAMPLE 9

Dried powdery sodium thiocyanate and potassium thiocyanate were mixed together in a mol ratio of 22:78. The mixture was heated and melted at 132° C. so as to be a uniform melt. This melt was quenched, solidified, then crushed and dried. Into 70 parts of this mixture were mixed 30 parts of a copolymer consisting of 91 parts of acrylonitrile, 7 parts of vinyl acetate and 2 parts of dimethylaminoethyl methacrylate. When the mixture was left in an air bath at 135° C. for about 30 minutes, a transparent thread-drawable polymer composition was obtained.

We claim:

1. An acrylic polymer composition consisting essentially of (1) an acrylonitrile polymer selected from the group consisting of an acrylonitrile homopolymer, and a copolymer of an acrylonitrile, said copolymer comprising a major proportion of acrylonitrile and a minor proportion of one or more other ethylenically unsaturated monomers copolymerizable with acrylonitrile and (2) a mixed substantially anhydrous molten mixture of at least two compounds selected from a group consisting of sodium thiocyanate, potassium thiocyanate, ammonium thiocyanate and thiourea, said mixture having a melting point below 150° C.

2. The composition according to claim 1 in which the mixed melt is formed from eutectic mixtures.

3. The composition according to claim 1 in which the polymer is present in amounts of up to 50% by weight, and preferably from 20–40.

References Cited

UNITED STATES PATENTS 2,632,750   3/1953   Justice _____ 260—30.8

ALLAN LIEBERMAN, Primary Examiner

T. MORRIS, Assistant Examiner